No. 746,958. PATENTED DEC. 15, 1903.
C. B. HATFIELD.
INSTRUMENT FOR MEASURING LASTS OR FEET.
APPLICATION FILED FEB. 16, 1903.
NO MODEL. 2 SHEETS—SHEET 1.
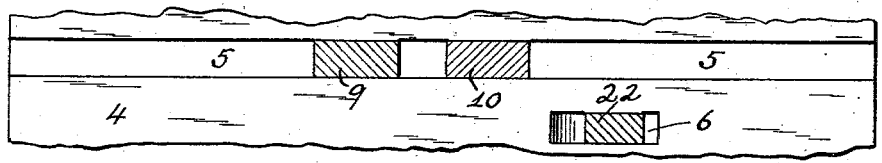
Fig. V
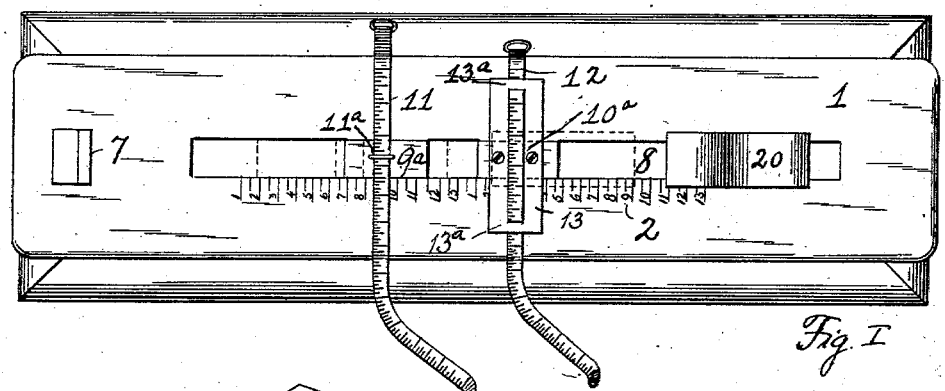
Fig. I
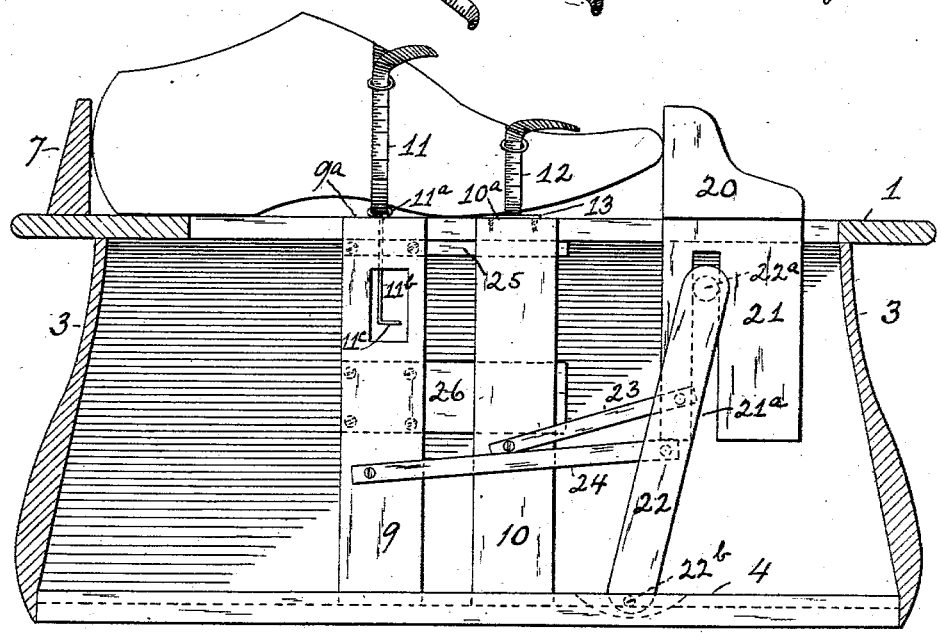
Fig. II
WITNESSES:
S. J. Cox
M. Hyndman
INVENTOR
Charles B. Hatfield
BY H. R. Baird
His ATTORNEY No. 746,958. PATENTED DEC. 15, 1903.
C. B. HATFIELD.
INSTRUMENT FOR MEASURING LASTS OR FEET.
APPLICATION FILED FEB. 16, 1903.
NO MODEL. 2 SHEETS—SHEET 2.
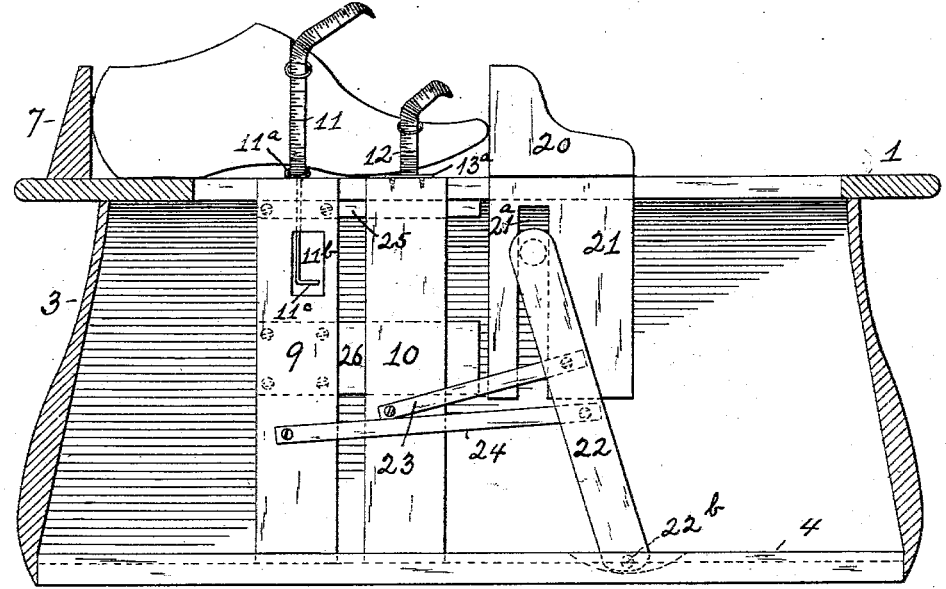
Fig. III.
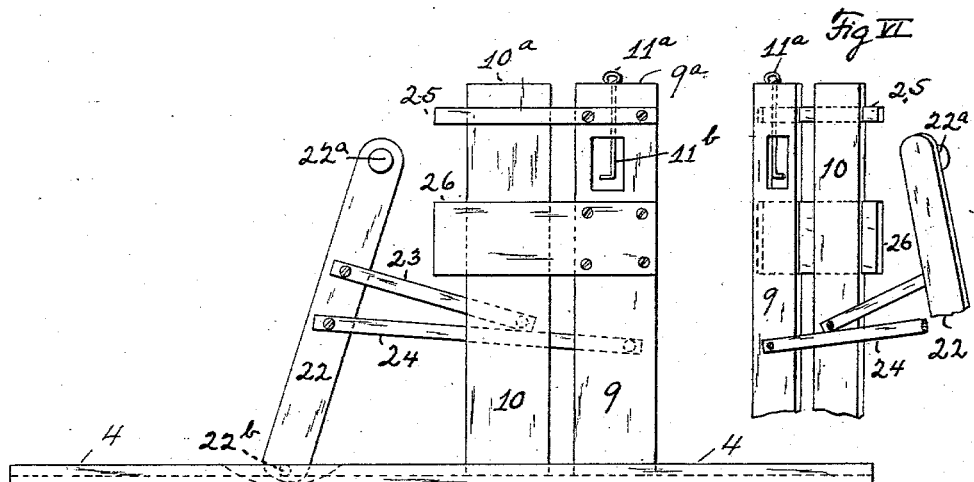
Fig. IV. Fig. VI.
WITNESSES:
S. J. Cox
M. Hyndman
INVENTOR
Charles B. Hatfield
BY H. R. Baird
His ATTORNEY No. 746,958.

Patented December 15, 1903.

UNITED STATES PATENT OFFICE.

CHARLES B. HATFIELD, OF PHILADELPHIA, PENNSYLVANIA.

INSTRUMENT FOR MEASURING LASTS OR FEET.

SPECIFICATION forming part of Letters Patent No. 746,958, dated December 15, 1903.

Application filed February 16, 1903. Serial No. 143,540. (No model.)

*To all whom it may concern:*

Be it known that I, CHARLES B. HATFIELD, a citizen of the United States, and a resident of Philadelphia, in the county of Philadelphia and Commonwealth of Pennsylvania, have invented certain new and useful Improvements in Instruments for Measuring Lasts or Feet; and I do hereby declare that the following is a full, clear, and exact description of the same, reference being had to the drawings accompanying this application.

My invention relates to instruments for measuring lasts and feet; and its novelty consists in the construction and adaptation of the parts, as will be more fully hereinafter pointed out.

There have been issued to me two patents of the United States, numbered, respectively, 581,721 and 655,228, for instruments in this class; and the subject-matter of this application is an improvement upon the devices described and claimed in those patents in the direction of simplicity of structure and economy in manufacture. The principle upon which the instruments which form the subject-matter of these former patents was based was the providing of means for obtaining longitudinal measurements of lasts or feet in combination with groups of indicators for locating predetermined points of circumferential measurement, so that a foot when measured by tapes the position of which was determined by these locators formed the basis whereby a last of the exact size of the foot measured could be made.

In the drawings, Figure I is a top plan view of my improved instrument. Fig. II is a side elevation of the interior mechanism thereof. Fig. III is a side elevation of the same mechanism, showing a different position of the tape-holders; and Fig. IV is a side elevation of the tape-holders from that side opposite to the one shown in Figs. II and III. Fig. V is a top plan view of the base-plate of the device with the tape-holders and oscillating lever in section, and Fig. VI is a perspective view of the oscillating lever and tape-holders.

In the drawings, 1 is a bar made of any suitable material to form a foot-support. It is provided on its face or upper surface with the usual graduations 2 of a shoemaker's size-stick, whereby the longitudinal measure of the object placed thereon—either the last or the foot—may be ascertained. It is supported by a framework consisting of side pieces 3 3 and a base-plate 4, the latter being grooved longitudinally at 5 and 6 for purposes which will presently appear. It is provided with a heel-piece 7, secured at one end, and with a longitudinal medial aperture 8 to permit of the insertion of the tape-holders.

The tape-holders consist of vertical bars 9 and 10, slidably mounted in the groove 5 of the base-plate 4, their lower ends fitting snugly within said groove. They extend upwardly and are adapted to pass through the aperture 8 in the bar 1, so that their upper surfaces $9^a$ and $10^a$ are flush with the face or upper surface of that bar.

The tapes 11 and 12 are secured to the tape-holders 9 and 10 by any suitable means. The means shown to secure the tape 11 to the holder 9 (this tape being adapted to be used in measuring the instep of the foot) is a ring $11^a$, formed by bending a wire $11^b$ into a loop, the shank of the wire passing downward through a suitable hole in the bar 9 and being bent at $11^c$, so that an upward movement sufficient to permit of its being pulled away from the bar 9 is not allowed, while at the same time it may reciprocate freely in a vertical direction, whereby the tape 11 may be brought close to the under surface of the foot or last when the measurement is taken.

The means shown to secure the tape 12 to the holder 10 (this tape being adapted to be used in measuring the ball of the foot) is a flat plate 13, provided with a transverse aperture and under the edges $13^a$ of which the tape is passed, the plate itself being secured to the top of the bar 10 by screws $13^b$ or any other suitable means.

The means for moving the tape-holders, and consequently the tapes, is as follows: A toe-piece 20, wider than the aperture 8, is provided with a dependent member 21, passing through that aperture, and which member is vertically slotted at $21^a$. This slot is adapted to receive a horizontal pin $22^a$, projecting from the side of an oscillating lever 22, which is pivoted upon a horizontal rod $22^b$ across the groove 6, so that the lower end of the oscillating lever can rock to and fro in this groove. The lever 22 is pivotally connected by a link 23 with the tape-holder 10 and by a link 24 with the tape-holder 9. This tape-holder is provided with two horizontally-projecting bars 25 and 26, engaging in suitable grooves cut into the sides of the holder 10, so that as the oscillating lever 22 is caused to move to and fro by the horizontal movement of the toe-piece 20 the holders 9 and 10 are compelled to slide horizontally in the groove 5 in the base-plate 4, the bars 25 and 26 keeping the holders 9 and 10 in alinement. The bar 25 also slides along the under surface of the bar 1 and assists in holding the tape-holder 9 in position.

It will readily be seen that for any given position of the toe-piece 20 the holders 9 and 10 will occupy certain positions with reference to the heel-piece 7 and each other, because the positions of the holders 9 and 10 are determined by the position of the oscillating lever 22 and the bars 23 and 24. Consequently if the toe-piece has been moved to a certain position to measure a foot and it is then afterward moved to the same position and a last placed on the bar 1 the positions of the holders 9 and 10 must be precisely the same as when the foot was measured, so that great accuracy in measurement can readily be secured.

It is obvious that wide variations may be made in the detail of my invention without departing from its essential principles. The device described is very simply made. All of the parts are made of wood or wood and screws and require no fine adjustments or finishing.

What I claim as new is—

1. In a device of the kind described, a graduated bar, a fixed heel-piece mounted thereon, a plurality of tapes slidably mounted transverse to the bar, a movable toe-piece, and means actuated by the toe-piece for moving the tapes along the bar.

2. In a device of the kind described, a graduated bar, a fixed heel-piece mounted thereon, a plurality of tapes slidably mounted transverse to the bar, a movable toe-piece, and means actuated by the toe-piece for moving the tapes along the bar and retaining them in a direction transverse thereto.

3. In a device of the kind described, a graduated bar, a fixed heel-piece mounted thereon, a plurality of tapes slidably mounted on holders transverse to the bar, a movable toe-piece, and means actuated by the toe-piece for moving the tapes along the bar and retaining them in a direction transverse thereto consisting of an oscillating lever moved by the toe-piece and connected by links to each of the tape-holders.

4. In a device of the kind described, a bar, a fixed heel-piece, a movable toe-piece, a pivoted lever adapted to be oscillated by the toe-piece, a sliding tape-holder and the tape thereon, a link connecting the lever and the tape-holder, and means for guiding the latter.

5. In a device of the kind described, a bar, a fixed heel-piece, a movable toe-piece, a pivoted lever adapted to be oscillated by the toe-piece, a sliding tape-holder, a link connecting the lever and the tape-holder, and means for connecting the tape to the holder whereby the tape may be moved away from the holder.

6. In a device of the kind described, a bar, a fixed heel-piece, a movable toe-piece, a pivoted lever adapted to be oscillated by the toe-piece, a plurality of sliding tape-holders, links connecting the lever and the said tape-holders, and means for guiding the latter.

7. In a device of the kind described, a bar, a fixed heel-piece, a movable toe-piece, a pivoted lever adapted to be oscillated by the toe-piece, a plurality of sliding tape-holders, links connecting the lever and the said tape-holders, and means for guiding the latter consisting of a groove in the base-plate of the device.

8. In a device of the kind described, a bar, a fixed heel-piece, a movable toe-piece, a pivoted lever adapted to be oscillated by the toe-piece, a plurality of sliding tape-holders, links connecting the lever and the said tape-holders, and means for guiding the latter consisting of a groove in the base-plate of the device, and rods rigidly secured to one of the tape-holders and adapted to engage with the other.

9. In a device of the kind described, a bar, a fixed heel-piece, a movable toe-piece, a pivoted lever adapted to be oscillated by the toe-piece, a plurality of sliding tape-holders, links connecting the lever and the said tape-holders, and means for guiding the latter consisting of a groove in the base-plate of the device, and a plurality of rods rigidly secured to one of the tape-holders and adapted to engage with the other and one of said rods being adapted to engage with the under side of the measuring-bar or foot-support.

Witness my hand this 6th day of February, 1903, at the city of Philadelphia, in the county of Philadelphia and Commonwealth of Pennsylvania.

CHARLES B. HATFIELD.

Witnesses:
CHARLES B. HATFIELD, Jr.,
EDWIN S. CARNES.